United States Patent [19]
Mason et al.

[11] 3,793,471
[45] Feb. 19, 1974

[54] READING AID FOR HANDICAPPED PERSONS

[76] Inventors: Henry J. Mason, 1432 E. 6th St., Brooklyn, N.Y. 11235; Geoffrey A. Jones, Box 148 A, RD No. 1, Emlemton, Pa. 16373

[22] Filed: Dec. 8, 1972

[21] Appl. No.: 313,290

Related U.S. Application Data

[63] Continuation-in-part of Ser. No. 143,356, May 14, 1971, abandoned.

[52] U.S. Cl. ............................................. 35/35 A
[51] Int. Cl. ......................................... G09b 21/00
[58] Field of Search 35/35 A; 179/1 SA; 250/219 FR; 178/DIG. 32

[56] References Cited
UNITED STATES PATENTS

| | | | |
|---|---|---|---|
| 3,229,387 | 1/1966 | Linvill | 35/35 A |
| 2,012,924 | 8/1935 | Conklin | 35/35 A X |
| 2,517,102 | 8/1950 | Flory | 35/35 A X |
| 2,866,279 | 12/1958 | Surber | 35/35 A |
| 3,395,247 | 7/1968 | Fieldgate | 35/35 A X |
| 3,461,303 | 8/1969 | Hanson | 250/219 DC |
| 3,230,644 | 1/1966 | Irazoqui | 35/35 A |
| 3,289,327 | 12/1966 | Chevillon | 35/35 A |

Primary Examiner—Wm. H. Grieb
Attorney, Agent, or Firm—Allison C. Collard

[57] ABSTRACT

A learning aid for the language handicapped in which phonemic language sounds are programmed onto light-sensitive film by a recording system, and played back by a playback system which activates a plurality of vibrating bimorph pins which represent the specific phonemic language sounds and tactually stimulate the skin of the person using the learning aid. The recording system includes a plurality of individual light sources and fiber optic tubes, vertically spaced apart adjacent the film, and a recording motor which advances the film past the light sources and fiber optic tubes. Selected vertically spaced-apart channels are exposed in the film for predetermined periods of time, the patterns thus recorded on the tape being detected by a similar fiber optic-light source detection means for activating selected ones of the vibrating pins in the playback system.

9 Claims, 6 Drawing Figures

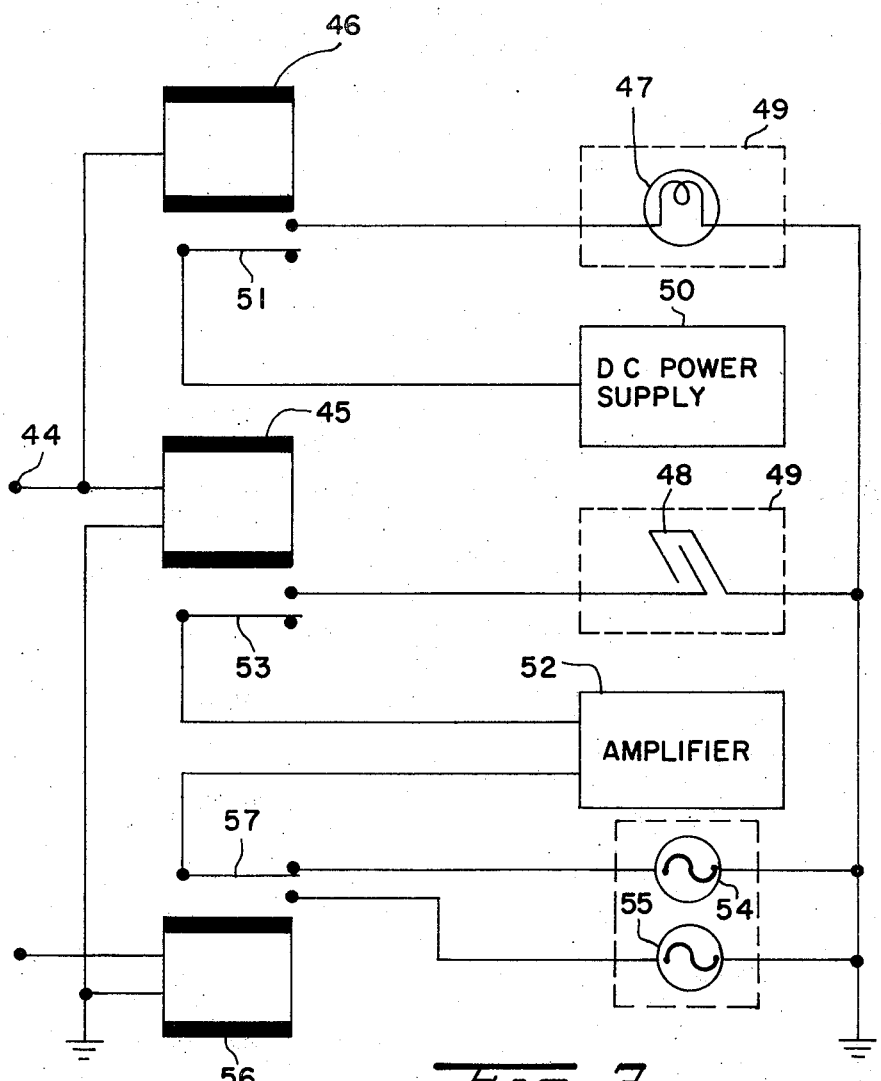
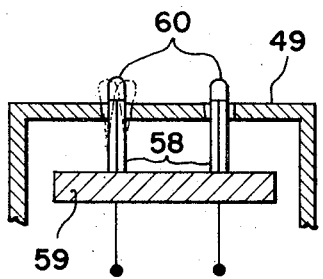
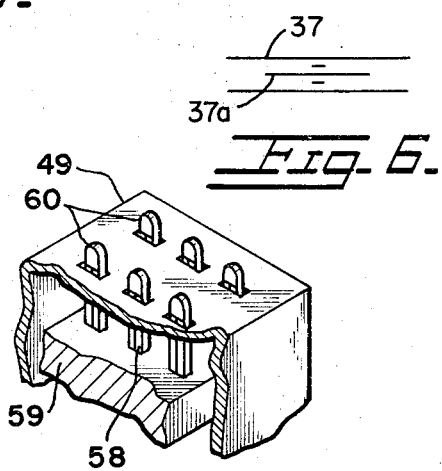
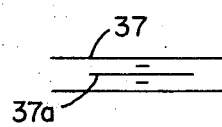
Fig. 3.
Fig. 4.
Fig. 5.
Fig. 6.

3,793,471

READING AID FOR HANDICAPPED PERSONS

This is a continuation-in-part of application Ser. No. 143,376, filed on May 14, 1971 now abandoned.

This invention relates generally to learning aids, and in particular to a teaching aid for the language handicapped.

Conventional tactile stimulator learning aids are intended to be used by blind handicapped persons, and generally supply, as a substitute for visual input, simulations of alphabetic characters which are sensed tactually by the handicapped person. Such learning aids, however, cannot be used to teach language handicapped persons, such as the deaf, hard of hearing, aphasics, the deaf-blind, and persons with auditory discrimination problems and reading disabilities, phonemes, the smallest of auditory speech units. The alphabetical and numerical characters, for example, Braille characters, generally simulated by the learning aids, cannot also represent phonemes, since the coding necessary to represent phonemic language units tactually differs considerably. Thus, such conventional learning aids are useful only for teaching blind handicapped individuals, who are afflicted with no other handicaps, to read.

Accordingly, the present invention provides a learning aid for the language handicapped in which phonemic language sounds are programmed onto light-sensitive film, which is played back by a suitable system which detects the language sounds on the film and activates a plurality of vibrating bimorph pins which tactually stimulate the skin of the person using the learning aid. The vibrating pins are activated in selected patterns which represent specific phonemic language sounds.

In the programming portion of the learning aid of the present invention, a speech therapist manually records those sounds which are to be used to teach the handicapped person. The programming portion of the learning aid includes a plurality of manual selection buttons, combinations of which represent phonemic language sounds. A memory register in the programming portion stores the selections made by the therapist and transmits each selection to a selection indicator so that the therapist can check those made. Manual buttons on the recording portion permit the therapist to choose one of several recording lengths, and upon choice of one of these, light-sensitive film is moved by a suitable driving mechanism past a recording head comprising a plurality of light sources and fiber optic tubes which transmit light from the sources to the film and expose it for the recording length chosen by the therapist. The recording head light sources and fiber optic tubes are vertically spaced apart and each is responsive to one of the selection buttons in the programming portion of the learning aid. The speech therapist, thus, selects the proper combination of buttons for the sound he wishes to represent, and the recording length, which controls the duration of vibration of the vibrating pins of the learning aid, for each specific phonemic sound to be taught to the handicapped person. In the playback portion of the learning aid, the exposed film is moved adjacent a light source and a plurality of fiber optic tubes. Light passing through the exposed portions of the film activate a plurality of phototransistors, each of which is coupled to one of the vibrating pins of the learning aid. In accordance with the pattern of the exposed portions of the film, selected ones of the vibrating pins are vibrated for a predetermined duration, and thus represent the phonemic sound to the handicapped person.

It is, therefore, an object of the present invention to provide a learning aid for the language handicapped which represents phonemic language sounds by means of coded tactual stimulations.

It is also an object of the present invention to provide a learning aid for the language handicapped which includes both a programming system and a playback system.

It is still another object of the present invention to provide a learning aid for the language handicapped which is simple in design, easy to manufacture, and efficient and reliable in operation.

Other objects and features of the present invention will become apparent when taken in connection with the accompanying drawings which disclose an illustrative embodiment of the invention. It is to be understood that the drawings are designed for the purposes of illustration only, and are not intended as a definition of the limits and scope of the invention disclosed.

In the drawings, wherein similar reference numerals denote similar elements throughout the several views:

FIG. 3 is a schematic block diagram of one embodiment of a driver circuit for the vibrating pins and indicators of the playback system of the learning aid;

FIG. 4 is a cross-sectional, side view of the vibrating board of the learning aid, showing the vibrating bimorph pins thereof;

FIG. 5 is a perspective view, partially broken away, of the vibrating board illustrated in FIG. 4; and FIG. 6 is a plan view of the light sensitive film strip having a plurality of horizontal, vertical and spaced-apart exposed portions of a selected length.

Figure 1:
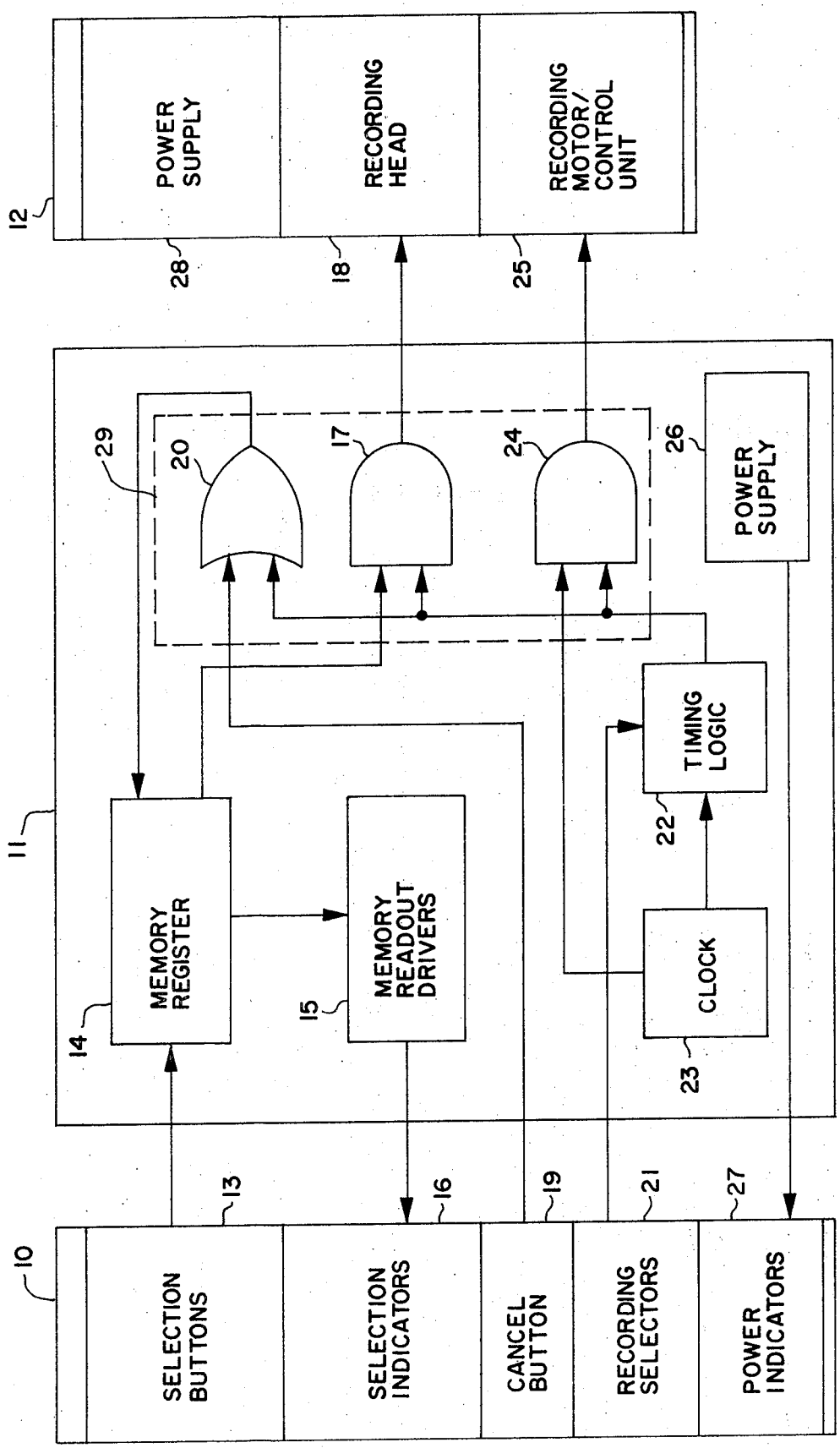
FIG. 1 is a schematic block diagram of a recording system of a learning aid for the language handicapped, constructed in accordance with the present invention.

Referring now to the drawings, specifically FIG. 1, there is shown a schematic block diagram of the recording system of the language aid for the handicapped of the present invention. The recording portion of the learning aid comprises a control panel 10 on which the speech therapist makes the selections to be recorded for use by the handicapped person. A control unit 11 is coupled to the control panel 10 and controls the recording of the selections made by the speech therapist. A recording deck 12 is coupled to the control unit and actually records the selections made by the therapist on the film.

Control panel 10 comprises a plurality of selection buttons 13, for selecting the number of vibrating pins which are to represent a specific phonemic language sound. Each of the selection buttons is coupled to a memory register 14 in control unit 11, which stores the selections made by the therapist. The selections are detected by memory read-out drivers 15 coupled to the memory register, which activate selection indicators 16, such as, for example, electrical lamps, on control panel 10. The selection buttons depressed by the speech therapist are thus represented individually by the selection indicators. A cancel button 19 is provided on control panel 10, and is coupled to memory register 14 by an OR gate 20 in logic circuit 29, for erasing the selections made if a mistake has been made.

A plurality of recording selectors 21, comprising manual push buttons, are also provided on control panel 10 for selecting the length of the recording, and, hence, the duration of the vibration of the pins selected. The recording selectors are coupled to a timing logic circuit 22 in the control unit, and to a pair of recording control gates, illustrated as AND gates 17 and 24, in logic circuit 29. A clock 23 is coupled to timing logic circuit 22, and gate 24 and generates a signal of a specified frequency which is divided by the timing logic circuit so as to produce a plurality of recording lengths each selectable by means of recording selectors 21. One of the input terminals of each of gates 20, 17 and 24 are coupled to timing logic circuit 22, for controlling the recording of the selections made on the control panel, and erasing the selections made from memory register 14 after the recording operation has terminated. Power supply 26 supplies electrical power to the control unit, and is coupled to a plurality of power indicators 27, such as, for example, electrical lamps, which indicate that power supply 26, and the circuits of the control unit, have been activated.

Recording deck 12 has its own power supply 28, and also comprises a recording head 18 coupled to gate 17, and a recording motor and control unit 25 coupled to gate 24. The recording head comprises a plurality of vertically spaced-apart light sources and fiber optic tubes past which the light-sensitive film is moved for exposing a plurality of vertically spaced-apart portions, comprising channels, of the film.

The operation of the programming portion of the learning aid is as follows:

Power supply 26 is activated, and after a predetermined time period, after which the power supply stabilizes, power indicators 27 are activated to indicate that the programming portion is ready to begin recording. The speech therapist then makes his first single or multiple selection of selection buttons 13, which correspond to the phonemic language sound which he wishes to record. These selections are transmitted to memory register 14, which stores the selections. Memory readout drivers 15 detect the selections made and stored in memory register 14, and activate corresponding selection indicators 16 on the control panel 10. If the therapist discovers that he has made a mistake, or if for any reason would like to change the selection, cancel button 19 is depressed, and transmits a signal to gate 20 in logic circuit 29 which erases the selections made in memory register 14. If the selections indicated are satisfactory to the speech therapist, one of the recording selectors 21 is depressed, thus selecting a specified recording length, corresponding to the duration of the vibrating pins, which is desired. Clock 23 generates a signal of a predetermined frequency, and transmits it to the timing logic circuit, which divides the frequency fractionally to produce a plurality of different recording lengths. For example, if the frequency generated by clock 23 is $f$, the timing logic could divide the frequency in one half and one quarter to produce three recording lengths, $f$, one half $f$, and one quarter $f$. The timing logic circuit divides the frequency produced by the clock corresponding to the recording selector depressed by the speech therapist. This frequency is transmitted to gates 20, 17 and 24 in logic circuit 29 for controlling the duration of the movement of the film past the recording head. A signal transmitted from timing logic circuit 22 to gates 17 and 24 activates recording head 18 and recording motor and control unit 25. The plurality of light sources in the recording head are thus selectively activated according to the selections made, and the film advanced past the fiber optic tubes, for exposing the channels of the film for the duration of the recording length selected. The signal from timing logic circuit 22 is also transmitted to gate 20, which erases the selections made in memory register 14, and resets the system for the next recording. The film is advanced past the recording head for a fractional distance after which the exposed portions of the channels terminate to space successive recordings apart from each other. It should be noted that logic circuit 29 includes a plurality of gates 20, 17 and 24 for each of the recording channels. Each channel corresponds further to a vibrating pin which is activated by the exposed portion of the channel. Only one set of the gates of the logic circuit have been illustrated in order to simplify the explanation of the operation of the invention.

Each of the phonemic language sounds to be represented are recorded individually by the speech therapist, and appear as a plurality of vertically spaced apart exposed portions of a selected length on the film strip. A plurality of selections appear in series with each other on the film.

Figure 2:
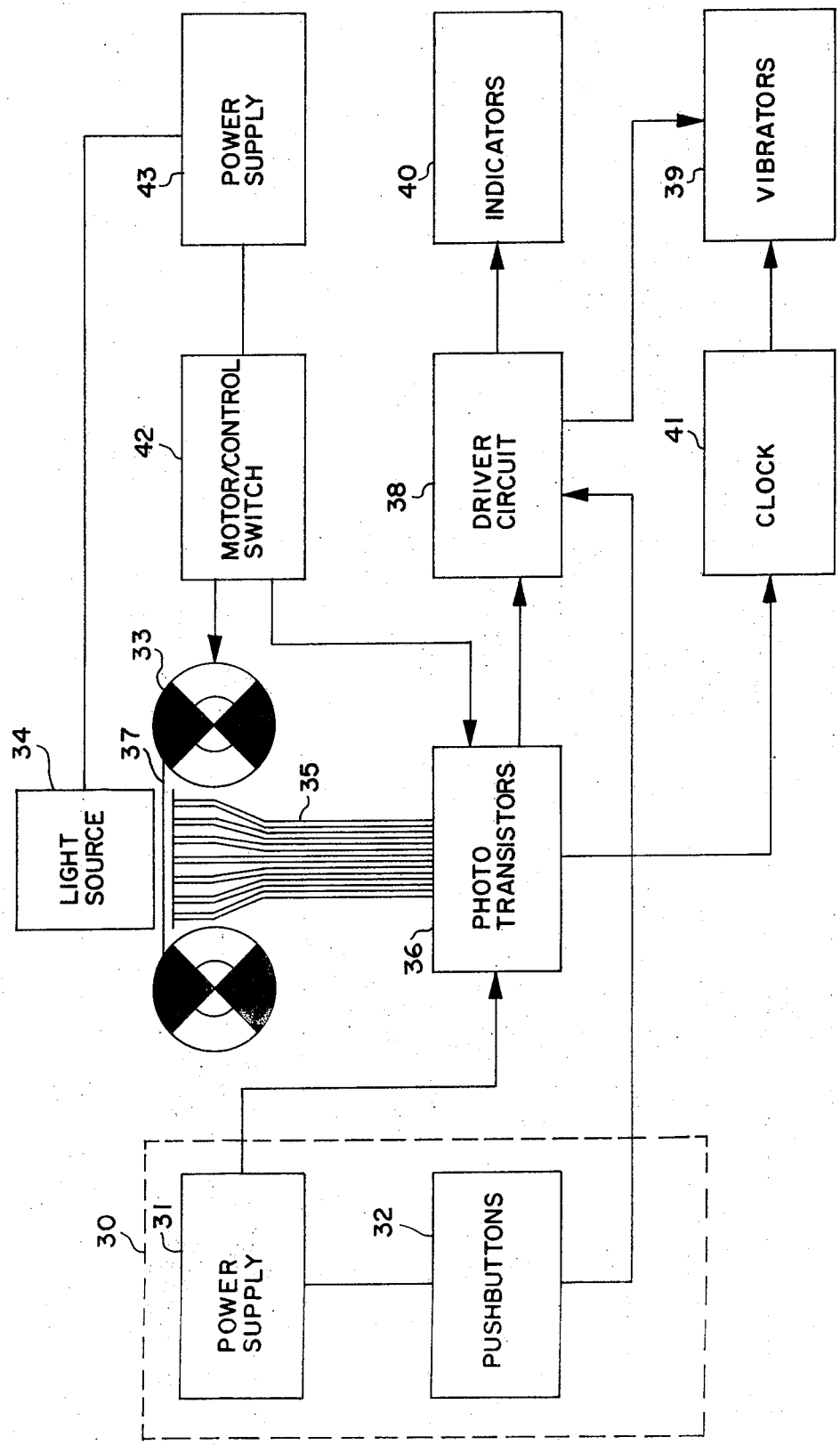
FIG. 2 is a schematic block diagram of a playback system of a learning aid for the language handicapped, constructed in accordance with the present invention.

FIG. 2 is a schematic diagram of a playback portion of the learning aid of the present invention. The playback portion comprises a control unit 30, which includes a power supply 31 and a plurality of control push buttons 32. The programmed film is mounted on a pair of reels 33 disposed adjacent a light source 34 and a plurality of vertically spaced-apart, fiber-optic tubes 35. A plurality of phototransistors 36, coupled to the vertically spaced apart fiber optic tubes, detect light transmitted through each of the channels of film 37. An amplifier and driver circuit 38 is coupled to the phototransistors for activating the vibrators 39, which comprise vibrating bimorph pins, and indicators 40, which comprise electrical lamps. Clock 41 is coupled to vibrators 39 and generates a frequency at which the vibrators vibrate in response to activation of phototransistors 36. A motor and control switch 42, activated by power supply 43, is coupled to reels 33 for advancing film 37 past light source 34 in fiber optic tubes 35. Push buttons 32 are coupled to amplifier/driver circuit 38 to allow manual operation of vibrators 39 and indicators 40.

The operation of the playback portion of the learning aid of the invention operates as follows:

Power supplies 31 and 43 are activated by a suitable manual switch, and energize the electronic circuits and motor of the playback portion of the learning aid. The exposed, programmed film 37 is mounted on reels 33, and then advanced past the light source 34 and fiber optic tubes 35 by means of the control switch 42. Light radiated from light source 34 is permitted to pass through the exposed portions of the channels of the film, and is detected by the vertically spaced-apart fiber optic tubes and phototransistors. The phototransistor corresponding to the channel of the film which is exposed detects the light passing therethrough and transmits a voltage signal to amplifier/driver circuit 38. A corresponding indicator 40 and vibrator 39 are accordingly activated. For each phonemic language sound recorded, a plurality of the indicators and vibrating pins are activated. Clock 41 generates the frequency at which vibrators 39 vibrate. The handicapped person utilizing the device places the fingers of his hand over the vibrating pins, which are disposed on a vibrating board, to detect the pattern of vibration of the vibrating pins, and thereby detect the phonemic language sound represented. A visual representation of the phonemic language sounds recorded is also given by the indicators of the playback portion of the learning aid. Each of the separate selections recorded on the film is represented by different patterns of vibrating pins sensed tactually by the handicapped person.

FIG. 3 is a schematic diagram of one embodiment of a driver circuit for the playback system illustrated in FIG. 2. Terminal 44 is coupled to an amplifier which amplifies the voltage outputs of phototransistors 36 so that the voltages activate relays 45 and 46. These relays individually actuate bimorph vibrating pin 48 on vibrating board 49 and electrical lamp 47. DC power supply 50 is coupled by relay switch 51 to lamp 47, for energizing the lamp when it is coupled to the power supply. Relay switch 53 couples amplifier 52 to bimorph 48. The amplifier is coupled to one of two oscillators 54 and 55 by relay switch 57 of relay 56 and may be coupled to a manual switch for manual selection of the frequency control by the speech therapist, or it may be coupled to a separate phototransistor, which is activated by one of the channels of the film, for selectively switching the frequency of vibration of the vibrating pins of the playback portion of the learning aid.

FIGS. 4 and 5 illustrate the vibrating pins and vibrating board 49. Bimorphs 58 are rigidly mounted on stationary mounting means 59, and have a pin 60 attached to the upper end thereof which extends through apertures in vibrating board 49 and contact the fingers of the handicapped person using the learning aid. The number of vibrating pins which comprise the vibrating board are variable, as is the configuration in which they are disposed in the vibrating board. Generally speaking, 16 bimorphs are preferably used to represent the phonemic language sounds which are to be taught to the handicapped persons. However, this number may vary according to the needs of the therapist and the number of phonemic language sounds which are desired to be represented.

FIG. 6 illustrates the elongated, light-sensitive film strip according to the present invention. Information 37A is defined on film strip 37 and is recorded thereon in a horizontal mode and represents phonemic language sounds.

While only several embodiments of the present invention have been shown and described, it will be obvious to those persons sklled in the art that many changes and modifications may be made thereunto without departing from the spirit and scope of the invention.

What is claimed is:

1. A learning aid for the language handicapped comprising:

an elongated film strip having a plurality of horizontal, vertically spaced-apart exposed portions of a selected length representing phonemic language sounds;
a light source;
a plurality of vertically spaced-apart fiber optic tubes disposed adjacent said light source;
a plurality of phototransistors coupled to said fiber optic tubes and responsive to light transmitted therethrough;
a pair of spaced-apart film reels disposed on adjacent sides of said light source for supporting the film strip between the light source and the fiber optic tubes;
a motor control coupled to said film reels and said phototransistors for advancing the film strip and activating the phototransistors
a plurality of vibrating pins coupled to the output of said phototransistors and responsive thereto, said horizontal exposed portions of the film strip and said fiber optic tubes being spaced apart at corresponding vertical positions so that light radiated from said light source and passing through said exposed portions of the film strip is detected by a corresponding plurality of fiber optic tubes and transmitted to said phototransistors, thereby selectively activating corresponding ones of said plurality of vibrating pins; and
a clock generator coupled to said vibrating pins and responsive to said phototransistors for vibrating said pins at a set frequency.

2. The learning aid as recited in claim 1, further comprising means for visually indicating the activation of said plurality of vibrating pins by said phototransistors.

3. The learning aid as recited in claim 2, wherein said vibrating pins each comprise a bimorph, and a rigid pin affixed to the end of said bimorph.

4. The learning aid as recited in claim 1, further comprising a first relay including a relay switch, responsive to at least one of said phototransistors, an amplifier coupled to the switch of said relay, and means for generating a signal of a predetermined frequency, said signal being amplified by said amplifier and coupled to at least one of said vibrating pins by said relay.

5. The learning aid as recited in claim 4, further comprising a second relay including a relay switch, responsive to at least one of said phototransistors, a DC power supply coupled to said second relay switch, and at least one electrical lamp, said second relay switch coupling the power supply to said electrical lamp when said first relay couples said amplifier to said vibrating pin.

6. The learning aid as recited in claim 5, wherein said means for generating said signal of predetermined frequency comprises a third relay including a relay switch, a first oscillator, and a second oscillator, coupled to said relay, said relay selectively coupling said first and second oscillators to said amplifier and said vibrating pins and thereby controlling the frequency of vibration of said vibrating pins.

7. An apparatus for recording phonemic language sounds on light-sensitive film tape and used for driving vibrating pins that represent the phonemic sounds to the handicapped comprising:

a plurality of light sources;
a plurality of vertically spaced-apart fiber optic tubes coupled to said light sources;
means for advancing a light-sensitive film strip adjacent said fiber optic tubes; and
means for controlling the illumination of said light sources that includes a plurality of selection buttons for selecting the light sources to be activated, wherein said light sources corresponding to the vibrating pins activated by the film strip, means for storing the selections made by said selection buttons, means for indicating the selections made, and a logic circuit coupled to said light sources and said storing means for selectively activating said light sources in response to the selections made by said selection buttons.

8. The learning aid as recited in claim 7, wherein said recording means further comprises a clock, for generating a recording length signal at a specified frequency, a timing logic circuit coupled to said clock, for dividing the frequency of said clock signal fractionally to form a plurality of different recording length signals, means for selecting one of said recording length signals and thereby selecting the recording length, and means responsive to said timing logic circuit, for advancing said film strip past said fiber optic tubes.

9. A learning aid for the language handicapped, comprising:
   an elongated light-sensitive film strip having a plurality of horizontal, vertically spaced-apart exposed portions of a selected length, said exposed portions representing phonemic language sounds;
   a light source;
   a plurality of vertically spaced-apart fiber optic tubes disposed adjacent said light source;
   a plurality of phototransistors coupled to said fiber optic tubes and responsive to light transmitted threthrough;
   means for advancing said film between said light source and said fiber optic tubes;
   a plurality of vibrating pins coupled to said phototransistors and responsive thereto, whereby light passing though said exposed portions of said film strip is transmitted by said fiber optic tubes to said phototransistors for activating said vibrating pins; and
   means, for recording phonemic language sounds on light-sensitive film that includes a plurality of light sources, a plurality of vertically spaced-apart fiber optic tubes coupled to said light sources, means for advancing a light-sensitive film strip adjacent said fiber optic tubes, and means for controlling the illumination of said light sources so that selected ones of said plurality of light sources are illuminated as said film strip is moved adjacent said fiber optic tubes to thereby expose selected vertically spaced-apart horizontal portions of said film strip for a predetermined length.

* * * * *